Patented Feb. 13, 1945

2,369,168

UNITED STATES PATENT OFFICE 2,369,168

SYNTHESIS OF VITAMIN A

Nicholas A. Milas, Belmont, Mass., assignor to Research Corporation, New York, N. Y., a corporation of New York No Drawing. Application March 3, 1942,
Serial No. 433,234

5 Claims. (Cl. 260—468)

The object of the present invention is to provide a new method for the synthesis of vitamin A and this invention constitutes a continuation-in-part of my co-pending applications Serial No. 353,775, filed August 22, 1940, and Serial No. 433,226, filed March 3, 1942.

The first essential step in the synthesis consists in allowing the Grignard (Compound I) or the Grignard (Compound Ia) in which X stands for halogen (Compounds I and Ia are disclosed as the Grignards of Compounds V and Va in my application Serial No. 433,226, filed March 3, 1942) to react in an atmosphere of nitrogen with Compound II in which R may be either an alkyl or an aryl group such as methyl, phenyl, palmityl, etc. to form Compound III or Compound IIIa.

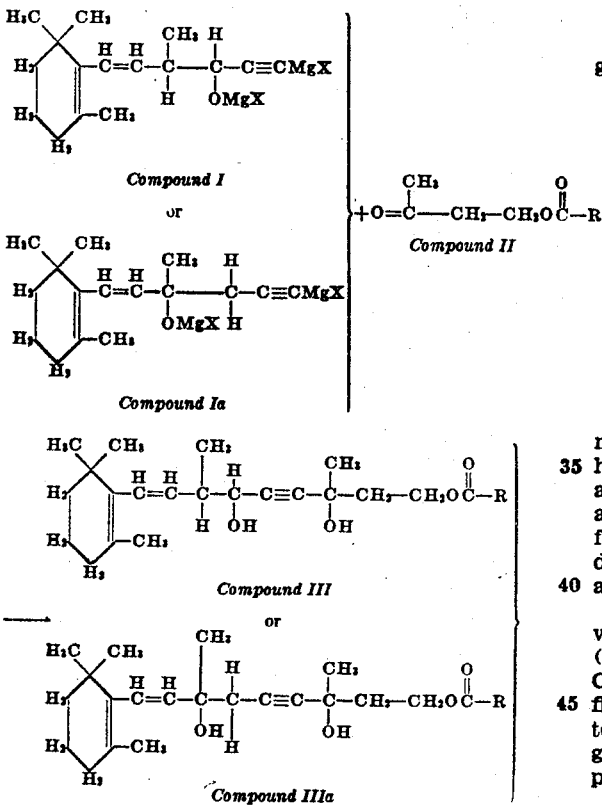

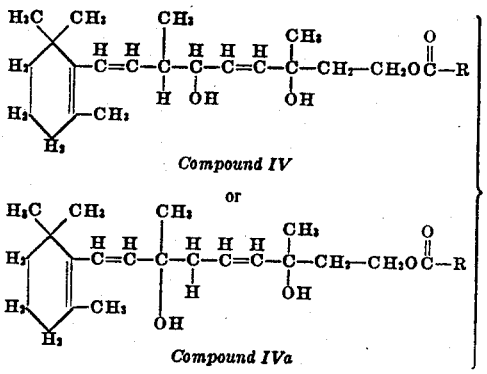

When Compound III or Compound IIIa is dissolved in a suitable solvent such as alcohol and treated with one mol of hydrogen, in the presence of palladium black, or under pressure of hydrogen in the presence of active iron, the acetylene bond is partially hydrogenated to an ethylene bond thereby forming Compound IV or Compound IVa.

Compounds IV and IVa are easily dehydrohalogenated and saponified at the same time to vitamin A by first treating them with a phosphorus halide like phosphorus trichloride or tribromide and subsequently heating the dihalogen ester with alcoholic potash. To form the ester of vitamin A from Compound IV or Compound IVa, one must dehydrate by heating with p-toluene sulfonic acid in the presence of benzene, toluene or xylene.

An alternative procedure for the preparation of vitamin A consists in allowing the Grignard (Compound V), (disclosed as the Grignard of Compound VII in application Serial No. 433,226, filed March 3, 1942) to react with Compound II to form Compound VI which is partially hydrogenated (acetylene→ethylene bond) to form Compound VII.

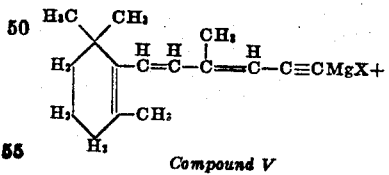

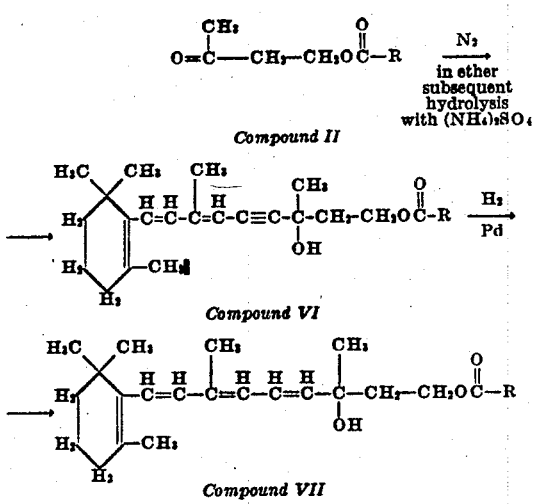

*Compound II*

*Compound VI*

*Compound VII*

To prepare vitamin A, Compound VII is dehydrohalogenated as in the case of Compound IV or Compound IVa, or if the ester is desired Compound VII is dehydrated with p-toluene sulfonic acid as in the case of Compound IV or Compound IVa.

A more detailed description of the various synthetic steps is to be found in the following pages:

*Synthesis of 1-[2',6',6'-trimethyl cyclohexen-1'-yl]-3,7-dimethyl 4,7-dihydroxy 9-acetoxy 5-yne nonene-1 (Compound III).*—A Grignard is prepared in 300 cc. of anhydrous ether from 16 g. of ethyl bromide and 3.6 g. of magnesium shavings. The mixture is then cooled to 0° and to it added in an atmosphere of nitrogen and with rapid stirring 20 g. of acetone carbinol {1-[2',6',6'-trimethyl cyclohexen-1'-yl]-3-methyl-4-hydroxy 1-ene hexyne-5} in 50 cc. of anhydrous ether in the course of half an hour. The mixture is then gently refluxed for three hours, then cooled to 0° (the mixture now contains Grignard Compound I) and 75 cc. of ethereal solution containing 9.6 g. of β-acetoxy ethyl methyl ketone (Compound II) is added to it in the course of one hour. The mixture, which now contains a flocculent white precipitate, is stirred and gently refluxed for 48 hours. It is then hydrolyzed by pouring the mixture on cracked ice containing 15 g. ammonium chloride. The product is extracted with ether, dried over anhydrous magnesium sulfate, the ether removed and the residue subjected to a high vacuum distillation to remove any excess acetylene carbinol and β-acetoxyethylmethylketone. The residues show the following analyses: A Zerewitinoff determination showed the presence of 1.8 active hydrogen atoms as against the theoretical of 2.0. Hydrogenation (PtO$_2$) showed the presence of 5.3 double bonds as against the theoretical of 4.0 for Compound III. The high value obtained for hydrogenation is attributed to the hydrogenolysis, in the presence of PtO$_2$, of the hydroxyl groups present in Compound III. Normal values are obtained when palladium black is substituted for platinum oxide.

The above procedure may be repeated with the substitution of {1-[2',6',6'-trimethyl cyclohexen-1'-yl]-3-hydroxy-3-methyl 1-ene hexyne-5} to produce Compound IIIa.

*Partial hydrogenation of Compounds III and IIIa to give Compounds IV and IVa.*—Compounds IV and IVa are easily produced by dissolving Compounds III and IIIa in alcohol and, in the presence of palladium black, adding exactly one mol of gaseous hydrogen under ordinary pressures. Compounds IV and IVa can also be produced by dissolving Compounds III and IIIa in alcohol and, in the presence of catalytically active iron, hydrogenating selectively under pressures between 20 and 100 atmospheres of hydrogen.

*Conversion of Compounds IV and IVa into the acetate of vitamin A.*—About 10 g. of Compound IV or IVa is dissolved in toluene containing about 0.1 g. of anhydrous p-toluene sulfonic acid and the mixture heated, in an atmosphere of nitrogen under a slightly reduced pressure, to such a temperature that the toluene together with the water formed distill over. When the toluene comes over clear, the reaction is over and the mixture is dissolved in ether and the solution shaken with a saturated solution of sodium carbonate to remove the p-toluene sulfonic acid. The ethereal solution is finally dried over anhydrous magnesium sulfate, filtered and the ether removed under reduced pressure. The residue responds to all the tests of vitamin A.

*Conversion of Compounds IV and IVa into vitamin A.*—To a solution of 75 cc. of dry benzene add 9 g. of phosphorus trichloride and cool the mixture to 0° and, while nitrogen is passing through the solution, add slowly in the course of a half hour 75 cc. of dry benzene containing 11.22 g. of Compound IV or IVa. The mixture is then heated on the water bath to the boiling point of benzene for one hour, then the benzene and the excess phosphorus trichloride are removed under reduced pressure. The residue is then treated with 30 g. of potassium hydroxide in 300 cc. of alcohol, and the resulting mixture heated on the water bath to 70–80° under slightly reduced pressure for one hour. Finally, most of the alcohol is removed under reduced pressure and the residue diluted with water to three to four times its original volume and extracted with ether. The ethereal extract is dried over anhydrous magnesium sulfate, filtered and the ether removed under reduced pressure. The residual, highly viscous, yellowish-orange oil exhibits all the properties of vitamin A. The alcoholic potash not only removes two mols of hydrogen chloride but simultaneously saponifies the acetate group thereby producing vitamin A itself.

Better yields of vitamin A are obtained by using, in the above reaction, an equivalent quantity of pyridine together with Compound IV or IVa in benzene and adding the mixture to the cold solution of benzene-phosphorus trichloride. It is also found advantageous to use phosphorus tribromide instead of phosphorus trichloride.

In all of the foregoing steps, the acetate has been used to exemplify the present process for the synthesis of vitamin A. However, the invention is not confined to this ester, since the benzoate, the propionate, the butyrate, the palmitate, or, in general, any acyloxy derivative are equally operative.

I claim:

1. Process which comprises mixing solutions of a compound of the formula

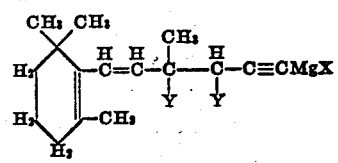

in which X stands for a halogen and one of the Y's stands for hydrogen and the other Y stands for OMgX in which X is a halogen and a compound of the formula

in which R is a member of the group consisting of alkyl and aryl groups, acidifying the resulting compound and recovering a product of the formula

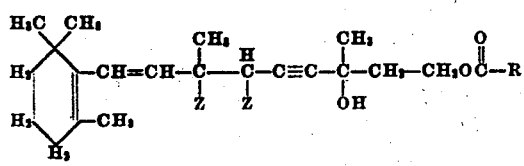

in which one of the Z's stands for hydrogen and the other for hydroxyl, and R stands for a member of the group consisting of alkyl and aryl groups.

2. Process which comprises mixing solutions of a compound of the formula

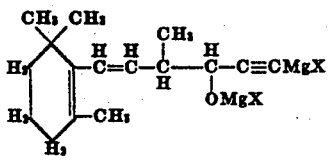

in which X stands for halogen, and a compound of the formula

in which R is a member of the group consisting of alkyl and aryl groups, acidifying the resulting compound and recovering the product of the formula

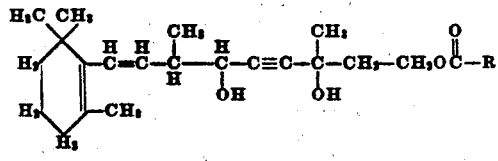

in which R stands for a member of the group consisting of alkyl and aryl groups.

3. Process which comprises mixing solutions of a compound of the formula

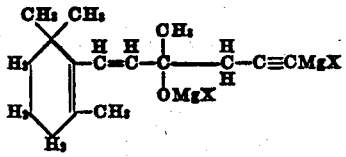

in which X stands for halogen, and a compound of the formula

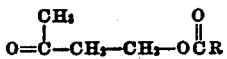

in which R is a member of the group consisting of alkyl and aryl groups, acidifying the resulting compound and recovering the product of the formula

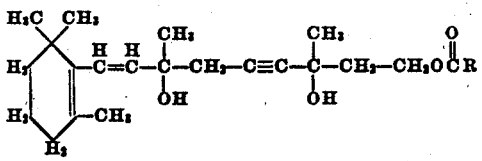

in which R stands for a member of the group consisting of alkyl and aryl groups.

4. A compound of the formula

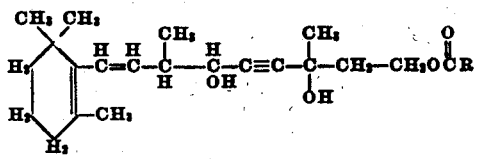

in which R stands for a member of the group consisting of alkyl and aryl groups.

5. A compound of the formula

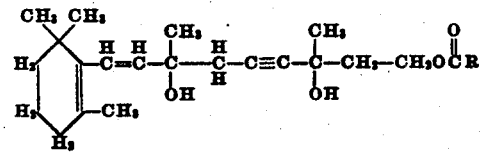

in which R stands for a member of the group consisting of alkyl and aryl groups.

NICHOLAS A. MILAS.